US010298621B2

(12) United States Patent
Srikanth et al.

(10) Patent No.: US 10,298,621 B2
(45) Date of Patent: *May 21, 2019

(54) MULTI CLOUD POLICY ENACTMENT VIA ORGANIZATIONS TO CLOUD-PROVIDER PARTNERSHIPS (71) Applicant: MICROSOFT TECHNOLOGY LICENSING, LLC, Redmond, WA (US)

(72) Inventors: Ranganathan Srikanth, Redmond, WA (US); David James Armour, Bellevue, WA (US); Ashvinkumar J. Sanghvi, Sammamish, WA (US); Jeremy Winter, Redmond, WA (US); John David Ballard, Woodinville, WA (US); Dwayne Richard Need, Woodinville, WA (US); Srivatsan Parthasarathy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,790

(22) Filed: Apr. 30, 2018

(65) Prior Publication Data
US 2018/0255107 A1 Sep. 6, 2018

Related U.S. Application Data (60) Continuation of application No. 15/430,303, filed on Feb. 10, 2017, now Pat. No. 9,961,114, which is a
(Continued)

(51) Int. Cl.
*H04L 29/06* (2006.01)
*G06Q 10/10* (2012.01)
(Continued)

(52) U.S. Cl.
CPC ............ *H04L 63/205* (2013.01); *G06F 21/45* (2013.01); *G06F 21/62* (2013.01); *G06Q 10/10* (2013.01);
(Continued)

(58) Field of Classification Search
CPC . G06F 21/62; H04L 63/0807; H04L 63/0823; H04L 63/0876; H04L 63/20;
(Continued)

(56) References Cited

U.S. PATENT DOCUMENTS 9,596,267 B2 * 3/2017 Srikanth .................. G06F 21/62
9,961,114 B2 * 5/2018 Srikanth .................. G06F 21/62

* cited by examiner

*Primary Examiner* — Baotran N To
(74) *Attorney, Agent, or Firm* — Workman Nydegger (57) ABSTRACT A method includes acts for establishing a subscription for an entity. The method includes receiving, at a cloud service provider, a request from an entity to establish a subscription. The request includes credentials for the entity that are not proper credentials for an organization associated with the entity that the entity should use to access services for the organization. The method further includes performing a corrective action based on detecting one or more factors to determine that the entity is associated with the organization. The method further includes providing services based on the corrective action.

20 Claims, 3 Drawing Sheets

Related U.S. Application Data division of application No. 14/469,476, filed on Aug. 26, 2014, now Pat. No. 9,596,267.

(51) Int. Cl.
*H04L 12/26* (2006.01)
*G06F 21/62* (2013.01)
*G06F 21/45* (2013.01)

(52) U.S. Cl.
CPC .............. *H04L 43/06* (2013.01); *H04L 63/08* (2013.01); *H04L 63/083* (2013.01); *H04L 63/0807* (2013.01); *H04L 63/0823* (2013.01); *H04L 63/0876* (2013.01); *H04L 63/105* (2013.01); *H04L 63/20* (2013.01); *G06F 2221/2117* (2013.01); *H04L 2463/082* (2013.01)

(58) Field of Classification Search
CPC ....... H04L 63/105; H04L 63/08; H04L 43/06; G06Q 10/10
USPC ............................................................ 726/1
See application file for complete search history.

MULTI CLOUD POLICY ENACTMENT VIA ORGANIZATIONS TO CLOUD-PROVIDER PARTNERSHIPS

CROSS-REFERENCE TO RELATED APPLICATIONS

This application is a continuation of U.S. patent application Ser. No. 15/430,303 filed on Feb. 10, 2017, entitled "MULTI CLOUD POLICY ENACTMENT VIA ORGANIZATIONS TO CLOUD-PROVIDER PARTNERSHIPS," which issued as U.S. Pat. No. 9,961,114 on May 1, 2018, which is a divisional of U.S. patent application Ser. No. 14/469,476 filed on Aug. 26, 2014, entitled "Multi Cloud Policy Enactment via Organizations to Cloud-Provider Partnerships," which issued as U.S. Pat. No. 9,596,267 on Mar. 14, 2017, both of which applications are incorporated herein by reference in their entirety.

BACKGROUND

Background and Relevant Art

Companies generally have an IT department to manage various needs of the company. For example, the IT department may manage inward facing services such as employee computer systems and internal company systems. The IT department may also manage various outwardly facing servers and systems configured to interact with company customers.

Some individuals within a company may see IT as a bottleneck, and thus may perform actions that circumvent IT. These actions are often referred to as "shadow IT". For example, individuals within a company may create or provision their own inwardly and outwardly facing IT solutions, but do not inform company IT of these solutions. Company IT is therefore not able to manage the solutions.

For example, there is historical evidence of where shadow IT might have involved various employees hiding servers under their desks and providing both inwardly and outwardly facing services from these servers without IT being aware of the servers. Today, with the prevalence of so called "cloud" based services, it is much simpler for individuals to subscribe to cloud services outside of IT control and to provide inwardly and outwardly facing services that are not controlled by the IT of the company. This resulted in different individuals in the company using different cloud services to provide various resources.

As might be imagined, shadow IT can create serious financial costs and potential risks to the company. In particular, shadow IT may be purchased using company resources, may represent itself as company provided, but may not have sufficient security or policies applied, which could subject the company to potential liability.

What has resulted is that companies have attempted to inject IT back into the equation by allowing individual entities at the company to use different cloud services, but by using IT as an intermediary. In particular, IT may provide a generic portal to a user to allow a user to request cloud services, but ultimately IT is responsible for requesting the services to ensure that they comply with company policy. However, this has done nothing more than putting the IT bottleneck back into the system. Additionally, IT may not be able to keep up adding and/or supporting the new features the cloud providers are constantly adding making their portal out of date and less appealing to their internal users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a cloud service provider system. The method includes acts for establishing a subscription for an entity. The method includes receiving, at a cloud service provider, a request from an entity to establish a subscription. The request includes credentials for the entity that are not proper credentials for an organization associated with the entity that the entity should use to access services for the organization. The method further includes performing a corrective action based on detecting one or more factors to determine that the entity is associated with the organization. The method further includes providing services based on the corrective action.

Another embodiment illustrated herein includes a method that may be practiced in a cloud provider service environment. The method includes acts for controlling services provided to and entity based on the entity being associated with a particular organization. The method includes, at a cloud service provider receiving a request for services provided by the provider. The method further includes identifying that the entity is associated with the particular organization. Based on the entity being associated with the particular organization, the method further includes querying a management service regarding polices for the particular organization that apply to the entity. The method further includes applying the policies to the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein may include functionality for mitigating problems with shadow IT. In particular, embodiments allow entities within an organization (e.g. a company) to directly interact with various cloud services. However, the cloud services may implement functionality to detect that the entities are associated with the organization. This may be done based on the entities logging in with organization credentials. Alternatively, this may be done by examining various characteristics of the interactions, such as networks used for the interaction, email domain names used to establish accounts, credit cards used to pay for the subscriptions, billing addresses used for subscriptions, phone numbers used for subscriptions, etc. Once the entity is identified as being associated with the organization, the cloud services can interact with a management service to determine polices for the organization that apply to the entity and can ensure that appropriate policies are applied.

In an alternate embodiment, the cloud service providers can detect that an entity associated with an organization is attempting to subscribe to cloud services at the cloud service providers. However, the cloud service providers may detect that the entities are attempting to request the services without using proper credentials for the organization. The cloud service providers can then perform corrective actions based on the determination. Further, the cloud service providers can provide services according to policies specified by the organization for the entities. Some corrective services may include, prompting the entity to request services using a proper organization credential, applying an organization policy to the services subscribed to by the entity, reporting the entity to the organization, etc.

Various features and benefits may be realized by the various different embodiments of the invention. For example, some embodiments may allow an organization to set the policies it wants its member to follow while using cloud-based services. Some embodiments may allow an organization to distribute content that it wants its members to use when using cloud-based services. Some embodiments may allow organizations to create partnerships with cloud providers. Some embodiments may use a partnership to enact the organizations policies while its members use the cloud provider's service. Some embodiments may allow a partnership to make its authorized content available to its members while they use the cloud provider's service. Some embodiments may allow an organization to monitor, audit, and track how its members use the cloud provider's service to ensure policy is being followed. Some embodiments may allow an organization's members to use the cloud provider's native user experience to interact with the cloud provider's service while following the organization's policies and using the organization's content. Some embodiments may provide a way to discover an organization's member who may be using a non-organizational identity. Some embodiments may provide a way for an organization to take ownership of an account that initially had been created without the organization's identity. In some such embodiments, an admin or coadmin account belonging to IT can be added on a service that was created by an employee without using the organization's identity. Some embodiments may allow an organization to create partnerships with multiple cloud providers. Some embodiments may allow an organization to define a policy once, but have it applied to a group of cloud provider partnerships. Some embodiments may allow an organization to create content once, but have it made available within all cloud provider partnerships Details are now illustrated.

Figure 1:
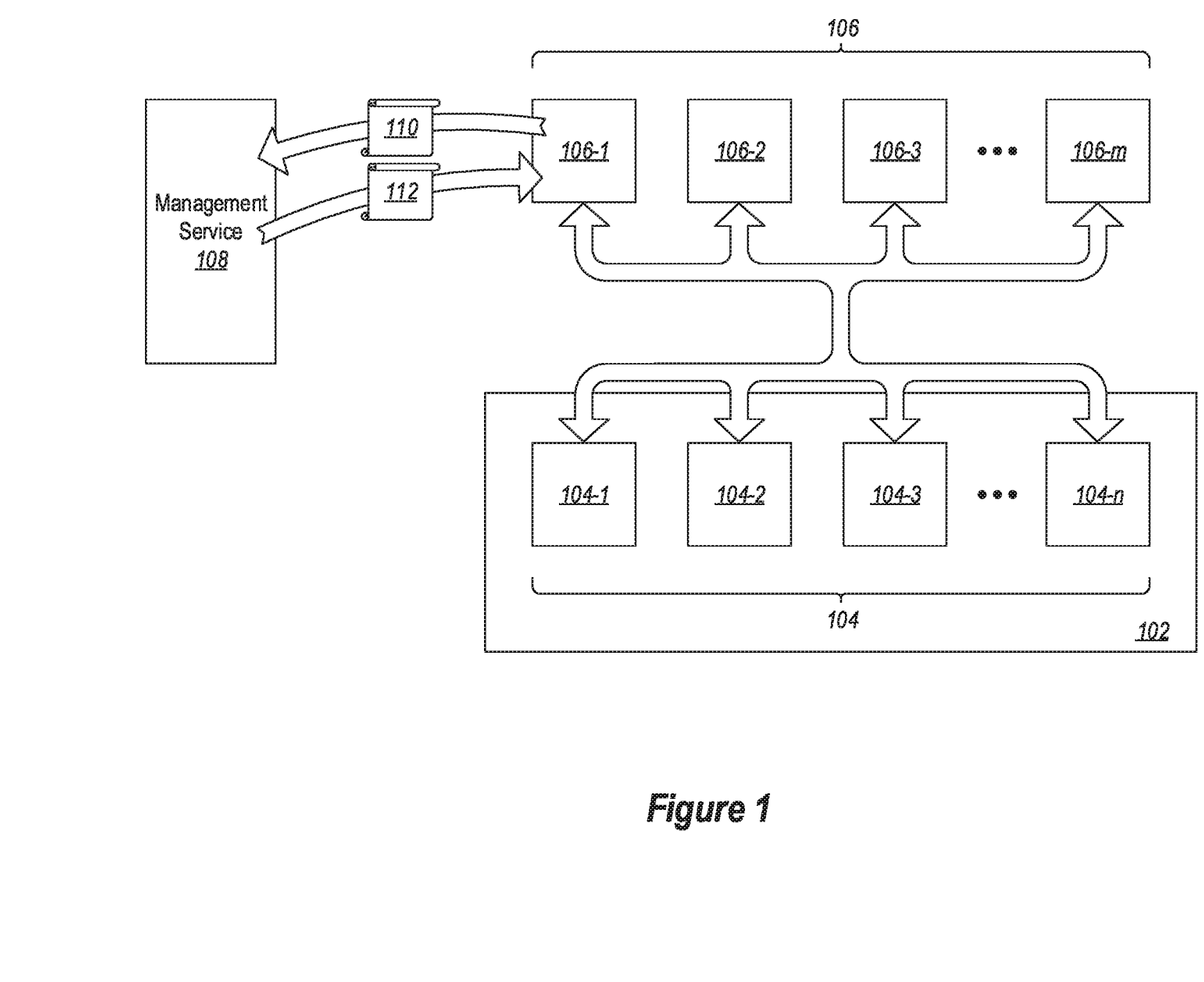
FIG. 1 illustrates entities associated with an organization accessing various cloud service providers.

Referring now to FIG. 1, an example is illustrated. In the example illustrated in FIG. 1, an organization 102 has associated with it a number of entities 104-1, 104-2, 104-3 through 104-n. The entities may wish to access a number of different cloud service providers 106-1, 106-2, 106-3 through 106-m. However, the organization 102 may wish for certain policies to be enforced when services are provided from the providers 106 to the entities 104. To facilitate this, the organization 102 may establish relationships with the providers 106 to cause the providers 106 to verify policy prior to providing services. In the example illustrated, this may be accomplished by using a management service 108.

The management service 108 facilitates discovery of service providers. This helps IT easily locate service providers that are willing to participate in a partnership. As partnerships are created, they are registered and tracked within the management service 108.

The organization 102 may decide to block traffic to any cloud service providers 106 that do not have a partnership or are not willing to form a partnership with the organization. This can be done, for example, using firewall rules on clients and/or organization networks. Thus, even if a rogue subscription was created with a rogue provider, the use of it is hampered from the organization network and organization managed machines.

Within the management service 108, IT for an organization can define resources that are uniquely available to associated entities at participating providers. For example, these resources may be physical assets. An example is IT creates a golden OS image. The management service 108 ensures that this OS image file is replicated to all of the participating partner service providers so that when employees visit a participating service provider, they can use (or in some embodiments, are forced to use) the corporate approved OS image.

In another example, embodiments may provide logical mapping. An example of this is a global private corporate network. A network resource is created at each participating service provider with each provider's unique network settings. Each of these network instances are then mapped as participating end points of the global private corporate network for the organization 102. Another example of logical mappings can be a situation where a provider's OS image is equivalent to the approved corporate OS image, so instead of copying the file, the IT staff maps the corporate image to the provider's image.

The management service 108 is provided with policy constraints from the organization 104. In some embodiments, this may be as a result of the management service 108 being part of the organization 102. In other embodiments, the management service may be a third-party service provider that is able to manage polices for various organizations by the organization providing the policies to the management service 108.

One example of policy considerations may be related to identity and authorization. IT for an organization 102 should be able to define their employees and define what they are authorized to do within their domain. The policy defined in the corporate domain is respected when an employee uses a service provider outside of the organization. Another policy consideration may be related to IT service management: IT will define policies including: approvals, change management, release management, incident management, asset management, etc. These policies are implemented and enforced by participating service providers. Additional policy details are illustrated below.

In the example illustrated, an entity (e.g. entity 104-1) will request services from a cloud service provider (e.g. provider 106-1). Such services may be, for example, compute, network or storage provided by virtual machines, etc. The cloud service provider 106-1 can determine that the entity 104-1 is associated with the organization 102. This may be accomplished in a number of differ ways. For example, in some embodiments, the user may attempt to use credentials that are provided by the organization 102 for use with the cloud service provider 106-1. In this case, it is trivial to identify that the entity 104-1 is associated with the organization 102.

However, in other embodiments, the entity 104-1, may be attempting to access services from the service provider 106-1 without using credentials provided by the organization for that purpose. This may be done surreptitiously, as the entity 104-1 does not want the organization to know that it is attempting to access resources. Alternatively, there may be no deceptive motive, but rather lack of education or mistake may be the reason for not using organization provided credentials. Nonetheless, the cloud service provider 106-1 may be able to determine that the entity 104-1 is associated with the organization 102. In particular, embodiments may be able to identify certain characteristics of an interaction to subscribe to services that can be used to deduce that the interaction is originating from an entity associated with the organization. For example, the entity may provide a physical address during sign-up that corresponds to the organization. Alternatively or additionally, network and/or IP addresses used in the interaction may correspond to the organization. Alternatively or additionally, credit cards used to complete the interaction may correspond to the organization. Alternatively or additionally, email address domains may correspond to the organization. Alternatively or additionally, access codes used to initiate the interaction may be those provided by, or associated with the organization (e.g. a special offer may be provided to entities along with an access code that corresponds to the organization). Etc.

There may be a two-step process performed. First, when the provider 106-1 suspects that the entity 104-1 is associated with the organization 102, there are a set of policies that are implemented. For example, if a credit card being used to sign up for a subscription belongs to the organization, the provider 106-1 may deny the creation of a subscription unless and until a real organization credential is presented. The second step involves confirming that the entity 104-1 is associated with the organization 102, such as by finally receiving the organization provided credential after prompting, and now enforcing other policies as described below.

Once the cloud service provider 106-1 determines that the entity 104-1 is associated with the organization 102, the cloud service provider 106-1 can consult with the management server 108 by sending a message 110 requesting permission to implement the subscription as requested by the entity 104-1. The management service 108 can send a message 112 allowing or denying the request, which the cloud service provider will honor.

Additionally, once a subscription has been established, the cloud service provider 106-1 can consult with the management service 108 to identify and ensure the appropriate policies are followed in the delivery of services effectuated by the subscription. Such policies may take a number of different forms.

For example, embodiments may have policies directed to the quantity and/or quality of services that can be provided by the cloud service provider 106-1 for the entity 104-1 as part of the organization 102.

In another example, embodiments may have policies directed to constraints on configuration provided by the cloud service provider 106-1 for the entity 104-1 as part of the organization 102. For example, such constraints may be directed to limitations on what disks may be used, what networks to connect to, what ports are opened on firewalls, whether anyone else outside the organization can be given accounts on the subscription, the amount of networking resources that can be used, the amount of compute resources (including number of processors, amount of memory, amount of processing operations, etc.) that can be used, the amount of storage resources that can be used, etc.

In another example, embodiments may have policies directed to auditing and monitoring provided by the cloud service provider 106-1 for the entity 104-1 as part of the organization 102.

In another example, embodiments may have policies directed to providing access to shared enablers provided by the cloud service provider 106-1 for the entity 104-1 as part of the organization 102. Such enablers may be, for example, templates, disks, images (such as golden disks), forms, content, networking, support, etc.

In another example, embodiments may have policies directed to controlling ownership. In particular, embodiments can ensure that if the entity 104-1 becomes no longer associated with the organization 102, that ownership of the subscription remains, nonetheless, with the organization 102.

Some embodiments described herein may include functionality for performing corrective actions when it can be determined that an entity is likely associated with an organization, but is using credentials to attempt to create a subscription that are not the expected credentials for an entity associated with the organization. For example, an organization 102 may have certain account identifiers (such as a username) or other credentials that are typically presented when entities 104 associated with the organization 102 attempt to create subscriptions with a cloud service provider, such as one of the cloud service providers 106. The cloud service provider (e.g. 106-1) may include functionality for detecting that an entity (e.g. 104-1) is associated with an organization 102, but is not using the expected credentials for the organization 102. The cloud service provider 106-1 can, as a result, perform some corrective action. Such corrective actions may include, for example, prompting the entity 104-1 to use the expected credentials, enforcing policies for the organization 102 on any subscription created, and/or reporting the entity 104-1 to the organization 102. Other corrective actions may be additionally or alternatively performed. The above corrective actions will now be discussed in more detail.

As noted, one of the corrective actions that may be performed by the cloud service provider 106-1 is to prompt the entity 104-1 to use the expected credentials. For example, the service provider 106-1 may simply provide a user interface element that directs a user to use the expected credentials. The user interface element may provide a suggestion. In some embodiments, the user interface element may identify to the entity 104-1 benefits of using the expected credentials. Such benefits may include volume discounts available to the organization, resources available to the organization (such as templates, network resources, compute resources, storage resources, golden disks, etc.). Some embodiments may provide the prompt through the use of an advertisement. Alternatively or additionally, some embodiments may provide a link, such as a hyperlink or other linking user interface element to direct an entity's navigation to an appropriate portal or interface for using the expected credentials. Alternatively, a notice may be displayed about the consequence of not providing the organization credentials. For example, a notice may be displayed indicating that an employee is violating the policy, may be terminated, reported to management, that disciplinary action may be taken, and/or some other appropriate notice.

An alternate or additional corrective action may be to enforce organization policies on any subscription created by the entity 104-1 whether or not the subscription is ultimately created using the expected organization credentials or not when it can be determined with certainty that the subscription is nonetheless being created on behalf of the organization. Thus, in some embodiments, an entity will be allowed to create a subscription on a cloud service provider using credentials selected by the entity but not recognized by the organization 102 for use in subscribing to services at the cloud service provider, but where nonetheless, policies for the organization 102 are enforced on the subscription by the entity.

Various services can be provided to the organization 102. For example, embodiments can provide cost tracking and estimation. IT for the organization 102 gets a central view across all service providers of costs and cost estimates, allowing IT for the organization 102 to better manage its budget for cloud services. Embodiments can provide usage tracking. IT for the organization 102 gets a central view of how its employees are using resources from participating providers. This helps IT for the organization 102 identify which resources are more popular and which entities use/don't use resources created by or assigned to them. Embodiments can provide service level agreement (SLA) monitoring. IT for the organization 102 gets a central view on how well service providers are delivering on their promised SLAs for uptime, availability, incident resolution, etc. Embodiments can provide risk assessment. IT for the organization 102 gets an assessment of risk based on a comparison of actual usage to the defined policies. Embodiments can provide compliance reports. IT for the organization 102 is able to create IT compliance reports across all its cloud usage.

The cloud service providers 106 perform various actions to facilitate the functionality illustrated herein. For example, subscriptions will be associated with a partnership with an organization 102. Embodiments include an API that defines an interface for cloud service providers 106 to implement handling subscription lifecycle notification events. Embodiments may include an interface for cloud service providers to handle the lifecycle of a partnership. A cloud service provider gets to participate throughout the partnership lifecycle including defining the semantics of the partnership and its configuration and policy for its resource.

When an admin on-boards a new cloud service provider, they can choose to enable the cloud service provider to honor partnerships and provide any cloud provider configuration as applicable. This can be per-plan. For example, in some embodiments this can be enabled only for premium enterprise subscriptions.

Embodiments may include functionality for on boarding a new IT partnership. When an admin on-boards a new organization/enterprise customer, they can enable self-service configuration of the IT partnership with the cloud platform and its various cloud service providers. The new IT admin uses this self-service experience (or APIs) to register their logical organizational assets and policy with this new cloud. Various assets and policy can be registered. The following illustrates various examples.

Embodiments can register identity and access management. For example, some embodiments may register Windows Azure Active Directory (WAAD) available from Microsoft Corporation of Redmond, Wash. for identity. Cloud platforms can federate to WAAD for identity (for single sign on) as well as for authorization and role-based access control (RBAC) policy. In the WAAD example, Red Dog Front End (RDFE) will pass on-behalf claims to each cloud service provider registered with it whenever create, read, update, and delete (CRUD) operations are performed on the partnership, subscriptions they govern or resources under a subscription. A cloud service provider can define a set of app roles that make sense for that resource. Embodiments may be implemented where the platform defines some App Roles profiles that all cloud service providers honor so the system is not too silo'ed. The new IT admin can choose which users or should be assigned which App Roles.

Embodiments can register an organization gallery. A cloud service provider may allow creation of a new IT gallery with IT content that all self-service users of subscriptions governed by this partnership can see and use. For example, embodiments may have a gallery including runbooks or VM templates. If a gallery has already been created previously for this organization at a different cloud service provider, the IT policy replication feature can allow syncing to that gallery from this cloud service provider.

Embodiments can register organization networks. The cloud service provider may allow creation of new organization level networks that all subscriptions governed by this partnership can see along with organization wide IP address space, DNS servers, site to site gateway routes/ACLs etc. The IT admin can also on-board previous organizational network definitions similar to the gallery scenario above.

Embodiments can register IT service management tools. New IT may have SaaS (software as a service) subscriptions to incident, change or request management tools. A cloud service provider can group those into a user experience that may be suitable for self-service users to use in that organization. The configuration for this cloud service provider (e.g. The SaaS endpoint that represents the organization account with that SaaS version can be configured during the on-boarding of a new partnership)

Embodiments can register an organization's big data storage account pool. A set of cloud storage accounts may be acquired by IT for the organization 102 for pooling together all the big data around usage of resources across all subscriptions they govern across many clouds. Embodiments provide a platform component (e.g. as a cloud service provider or in the platform) that can help other cloud service providers in that cloud to batch upload or stream up real-time management data about the resources from the cloud service provider's perspective. This will enable management tools to offer monitoring, compliance, chargeback and analytics of these cloud assets to an organization's central IT.

Embodiments can register discovery and targeting. The partner is able to identify accounts which possibly belong to an organization and target notifications ("advertisements") to encourage the user to register their subscription with the organization. This discovery of possible accounts could be based on billing information (corporate credit card or corporate billing email) or source IP address or shared ownership with a corporate account or some other method, such as those illustrated previously, or other appropriate methods.

The following now illustrates details regarding associating an existing subscription with an IT partnership. When central IT for the organization 102 acquires a new subscription, it is associated with their partnership with the cloud. When an entity goes to the hoster's portal to acquire a new subscription they can be prompted for single sign on with their organizational credentials (after a home realm discovery). If a partnership has been created by that corporations IT department (who owns the domain's identity provider) then automatically that subscription is brought into management provided by the management service 108. The model allows IT for the organization 102 to bring subscriptions that were created previously with shadow IT under formal management as the partnership concept exists at a layer below that of a subscription. When a front end, such as RDFE, routes a call to an cloud service provider it also passes in the corresponding partnership ID if one exists, thus always tying the ops data regarding that resource to that of the partnership.

Since cloud service providers are extensible, this model can extend to new kinds of resources. Support for other clouds can also be added at a later time, by having proxy layers over them implement the partnership support on their behalf.

Once a partnership is established it allows IT for the organization 102 to close the monitoring-configuration feedback loop in interesting ways. It is not just service providers who can participate but even in-guest agents. For example, one can use in-guest configuration compliance assessment systems like Desired State Configuration (DSC) available from Microsoft Corporation, to gather and push configuration data to the cloud, run compliance rules over it and use control system like a virtual machine manager or a gateway cloud service provider to enforce compliance. For example, embodiments may be able to quarantine virtual machines by setting various configuration settings.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
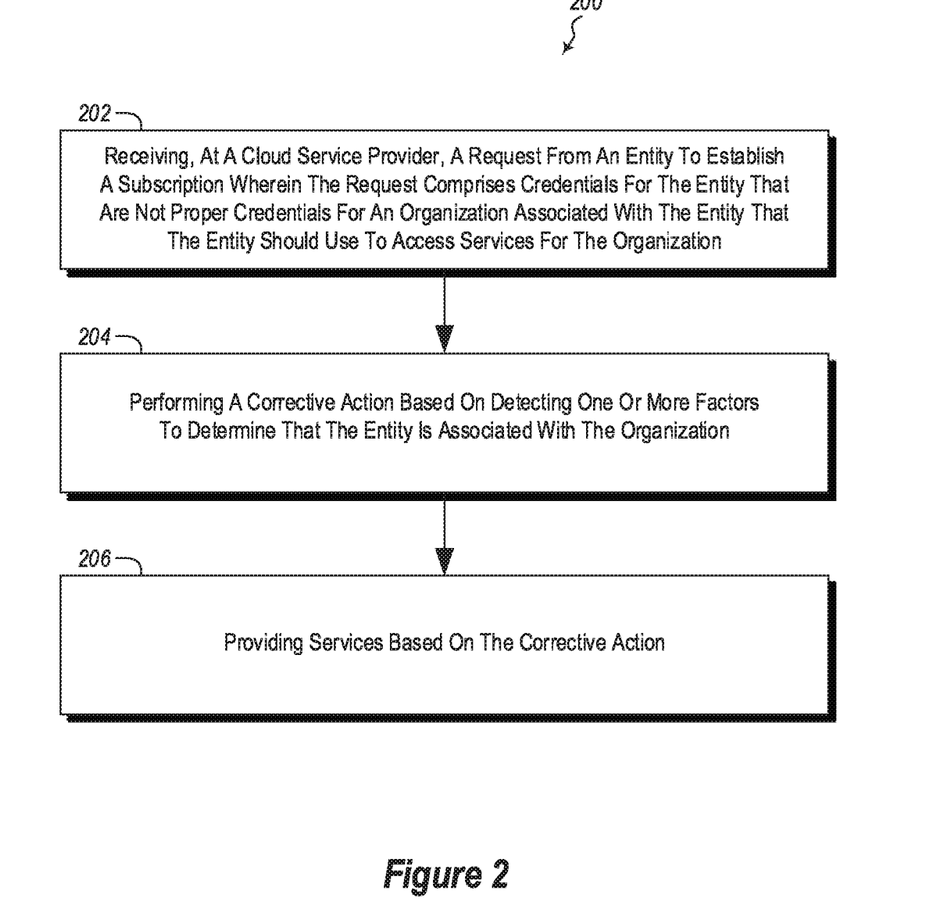
FIG. 2 illustrates a method of establishing a subscription for an entity.

Referring now to FIG. 2, a method 200 is illustrated. The method 200 may be practiced in a cloud service provider system. The method 200 includes acts for establishing a subscription for an entity. The method 200 includes receiving, at a cloud service provider, a request from the entity to establish a subscription wherein the request comprises credentials for the entity that are not proper credentials for an organization associated with the entity that the entity should use to access services for the organization (act 202). For example, the entity 104-1 may provide credentials to a cloud service provider 106-1 that are not appropriate credentials for the organization 102 that would ordinarily be used to subscribe to the cloud service provider 106-1.

The method 200 further includes performing a corrective action based on detecting one or more factors to determine that the entity is associated with the organization (act 204). Various corrective actions are described in more detail below in the non-exhaustive examples below.

The method 200 further includes providing services based on the corrective action (act 206). Various non-exhaustive examples are illustrated below.

The method 200 may be practiced where the corrective action includes a prompt to the entity identifying the organization and prompting to provide proper credentials for accessing services for the organization. In one embodiment, prompting includes providing an advertisement advertising services available to the organization. Alternatively or additionally, prompting may include describing benefits of using credentials for the organization. Such benefits may be, for example, cheaper cost, availability of resources such as templates, network, support, policy, etc.

Alternatively or additionally, the method 200 may be practiced where the corrective action includes a prompt to the entity with a warning. For example, a notice may be displayed about the consequence of not providing the organization credentials. For example, a notice may be displayed indicating that an employee is violating the policy, may be terminated, reported to management, that disciplinary action may be taken, and/or some other appropriate notice.

The method 200 may be practiced where the corrective action includes applying policy, such as restrictive usage and management, for the organization. Such polies may include, for example, one or more of quantity and/or quality of service; constraints on configuration; audit and monitoring, access to shared enablers, ownership, etc.

The method 200 may be practiced where the corrective action includes reporting to the organization. For example, an entity attempting to create shadow IP could be reported to the organization 102. The organization 102 could then apply any corrective action the organization deemed appropriate. In some embodiments, a corrective action may be requiring the approval of a manager or someone else in the organization 102.

The 200 may further include detecting improper credentials that are nonetheless associated with the organization. For example, detecting improper credentials may include detecting credit cards belonging to or associated with the organization, the organization's physical address, one or more ip addresses associated with the organization, one or more phone numbers associated with the organization, one or more email addresses associated with the organization, one or more invitation codes associated with the organization, etc.

Figure 3:
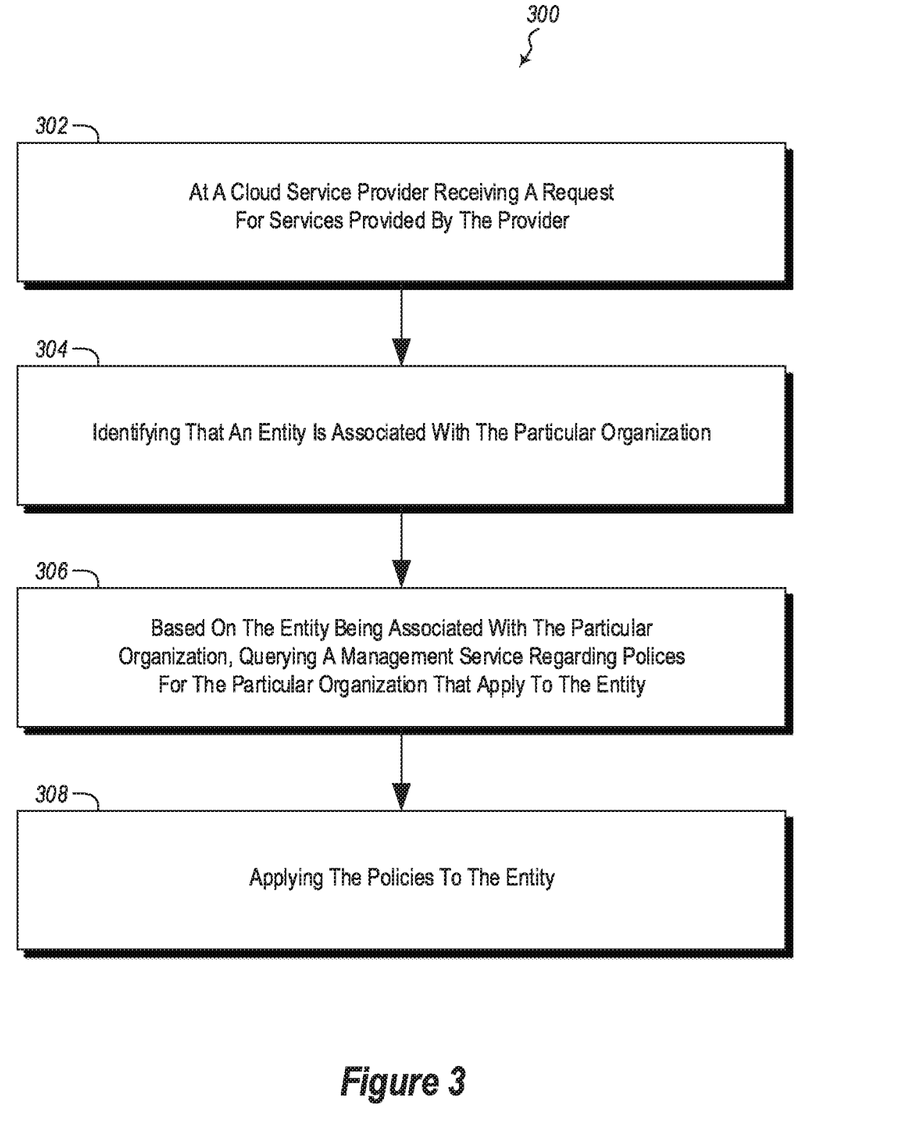
FIG. 3 illustrates a method of controlling services provided to an entity based on the entity being associated with a particular organization

Referring now to FIG. 3, a method 300 is illustrated. The method 300 may be practiced in a cloud provider service environment. The method 300 includes acts for controlling services provided to entity based on the entity being associated a particular organization. The method includes, at a cloud service provider receiving a request for services provided by the provider (act 302).

The method 300 further includes identifying that the entity is associated with the particular organization (act 304).

Based on the entity being associated with the particular organization, the method 300 further includes querying a management service regarding polices for the particular organization that apply to the entity (act 306).

The method 300 further includes applying the policies to the entity (act 308). In some embodiments, the management service is a third party service not provided by the organization or the cloud providers. However, in other embodiments, the management service is part of the organization.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a cloud provider service environment, a method of controlling services provided to an entity based on the entity being associated with a particular organization, the method comprising:
   at a cloud service provider, receiving a request from an entity for services provided by the cloud service provider, the request including user provided identification information;
   at the cloud service provider, determining that the user provided identification information does not match stored information associated with a particular organization at the cloud service provider;
   at the cloud service provider, identifying that the entity is associated with the particular organization by detecting additional information associated with the entity which is distinguished from the user provided identification information;
   at the cloud service provider, based on the entity being associated with the particular organization, and even though the user provided identification information does not match stored information associated with the particular organization, performing a corrective action; and
   providing the services to the entity.

2. The method of claim 1, wherein the corrective action comprises identifying a policy of the particular organization and applying the policy while providing the entity with the services.

3. The method of claim 1, wherein the additional information includes:
   a network identifier associated with the entity.

4. The method of claim 1, wherein the additional information includes:
a billing identifier associated with the entity.

5. The method of claim 1, wherein the additional information includes:
a physical location associated with the entity.

6. The method of claim 1, wherein the additional information includes:
an email domain associated with the entity.

7. The method of claim 1, wherein the additional information includes:
an access code associated with the entity.

8. The method of claim 1, wherein the additional information includes:
a phone number associated with the entity.

9. A computing device, comprising:
one or more processors; and
one or more computer readable hardware storage device, wherein the one or more computer readable hardware storage device comprises stored computer executable instructions that are executable by at least one of the one or more processors to cause at least one of the one or more processors to implement a method of controlling services provided to an entity based on the entity being associated with a particular organization, the method comprising:
receiving a request from an entity for services provided by the cloud service provider, the request including user provided identification information;
determining that the user provided identification information does not match stored information associated with a particular organization at the cloud service provider;
identifying that the entity is associated with the particular organization by detecting additional information associated with the entity which is distinguished from the user provided identification information;
based on the entity being associated with the particular organization, and even though the user provided identification information does not match stored information associated with the particular organization, performing a corrective action; and
providing the services to the entity.

10. The computing device of claim 9, wherein the corrective action comprises identifying a policy of the particular organization and applying the policy while providing the entity with the services.

11. The computing device of claim 9, wherein the additional information includes:
a network identifier associated with the entity.

12. The computing device of claim 9, wherein the additional information includes:
a billing identifier associated with the entity.

13. The computing device of claim 9, wherein the additional information includes:
a physical location associated with the entity.

14. The computing device of claim 9, wherein the additional information includes:
an email domain associated with the entity.

15. The computing device of claim 9, wherein the additional information includes:
an access code associated with the entity.

16. The computing device of claim 9, wherein the additional information includes:
a phone number associated with the entity.

17. The computing device of claim 9, wherein the method further includes adding at least one additional service to the services provided to the entity, the at least one additional service being a service of an account associated with the particular organization.

18. The computing device of claim 9, wherein the method further includes creating a subscription of the particular organization with the service provider.

19. The computing device of claim 18, wherein the method further includes applying the subscription to a management service of the particular organization and applying policies of the particular organization to the subscription.

20. A computer program product comprising one or more computer readable hardware storage devices having stored thereon computer-executable instructions that are executable by one or more processors of a computing system comprising a cloud service provider to cause the computing system to implement a method of controlling services provided to an entity based on the entity being associated with a particular organization, the method comprising:
receiving a request from an entity for services provided by the cloud service provider, the request including user provided identification information;
determining that the user provided identification information does not match stored information associated with a particular organization at the cloud service provider;
identifying that the entity is associated with the particular organization by detecting additional information associated with the entity which is distinguished from the user provided identification information;
based on the entity being associated with the particular organization, and even though the user provided identification information does not match stored information associated with the particular organization, performing a corrective action; and
providing the services to the entity.

* * * * *